United States Patent
Um et al.

(10) Patent No.: US 8,344,946 B2
(45) Date of Patent: Jan. 1, 2013

(54) SINGLE FREQUENCY USER IONOSPHERE SYSTEM AND TECHNIQUE

(75) Inventors: Gregory S. Um, Torrance, CA (US); Mark Wayne Biggs, Fullerton, CA (US); Timothy Schempp, Anaheim, CA (US)

(73) Assignee: Raytheon Company, Waltham, MA (US)

( * ) Notice: Subject to any disclaimer, the term of this patent is extended or adjusted under 35 U.S.C. 154(b) by 306 days.

(21) Appl. No.: 12/860,954

(22) Filed: Aug. 23, 2010

(65) Prior Publication Data

US 2011/0050492 A1 Mar. 3, 2011

Related U.S. Application Data

(60) Provisional application No. 61/236,601, filed on Aug. 25, 2009.

(51) Int. Cl.
*G01S 19/20* (2010.01)
(52) U.S. Cl. .................................. 342/357.58
(58) Field of Classification Search .............. 342/357.58
See application file for complete search history.

(56) References Cited

U.S. PATENT DOCUMENTS

2005/0146459 A1  7/2005 Dentinger et al.
2009/0091493 A1* 4/2009 Hwang et al. ............ 342/357.02

FOREIGN PATENT DOCUMENTS

WO  WO 2009/043835 A1  4/2009

OTHER PUBLICATIONS

International Preliminary Report on Patentability of the ISA for PCT/US2010/046259 dated Mar. 8, 2012.
Henkel, et al.; "Multifrequency, Multisatellite Vector Phase-Locked Loop for Robust Carrier Tracking;" IEEE Journal of Selected Topics in Signal Processing; vol. 3; No. 4; Aug. 2009; pp. 674-681.
PCT Search Report of the ISA for PCT/US2010/046259 dated May 17, 2011.
Written Opinion of the ISA for PCT/US2010/046259 dated May 17, 2011.
Henkel, et al.; "Multifrequency, Multisatellite Vector Phase-Locked Loop for Robust Carrier Tracking;" IEEE Journal of Selected Topics in Signal Processing, vol. 3; No. 4; Aug. 2009, pp. 674-681.
Partial PCT Search Report received with Invitation to Pay Additional Fees in PCT/US2010/046259 dated Nov. 29, 2010.
Wu et al.; "A Single Frequency Approach to Mitigation of Ionospheric Depletion Events for SBAS in Equatorial Regions;" 19$^{th}$ International Technical Meeting of the Institute of Navigation Satellite Division; Ft. Worth, TX; Sep. 26-29, 2006; 14 pages.
Wu et al.; "A Single Frequency Approach to Mitigation of Ionospheric Depletion Events for SBAS in Equatorial Regions;" 19$^{th}$ International Technical Meeting of the Institute of Navigation Satellite Division; Ft. Worth, TX; PowerPoint Presentation; Sep. 26-29, 2006; 16 slides.

* cited by examiner

*Primary Examiner* — Harry Liu
(74) *Attorney, Agent, or Firm* — Daly, Crowley, Mofford & Durkee, LLP

(57) ABSTRACT

A method and apparatus for directly estimating depleted ionosphere delay in a GPS receiver and using the estimate for improved navigation precision in satellite based augmentation systems.

32 Claims, 7 Drawing Sheets

SINGLE FREQUENCY USER IONOSPHERE SYSTEM AND TECHNIQUE

CROSS-REFERENCE TO RELATED APPLICATIONS

This application CLAIMS PRIORITY to U.S. Provisional Application Ser. No. 61/236,601, filed on Aug. 25, 2009, which is incorporated herein by reference in its entirety.

FIELD OF THE INVENTION

The system and techniques described herein relate generally to navigation systems, including but not limited to air traffic control systems and more particularly to a method and apparatus for directly estimating depleted or residual ionosphere delay and using the estimate for navigation in an aircraft.

BACKGROUND OF THE INVENTION

Current Satellite-Based Augmentation Systems (SBAS) in the mid magnetic latitudes can provide a certain level of precision guidance for single frequency users; however, the ionospheric phenomena typically found at the equatorial latitudes significantly challenges current SBAS approaches to precision guidance. The three major phenomena causing the challenging accuracy distortions are the equatorial anomaly, depletion features (bubbles), and scintillations. Within approximately ±20 degrees of the magnetic equator is the so-called equatorial anomaly, which is the occurrence of a trough of concentrated ionization in the so-called $F_2$ layer of the Earths' atmosphere. The Earth's magnetic field lines are horizontal at the magnetic equator. Solar heating and tidal oscillations in the lower ionosphere move plasma up and across the magnetic field lines. This sets up a sheet of electric current in the E region which, with the horizontal magnetic field, forces ionization up into the F layer, concentrating at ±20 degrees from the magnetic equator. This phenomenon is also known as the equatorial fountain. The equatorial ionosphere anomaly is an age-old problem that affects navigation systems.

In commercial global positioning system (GPS) based navigation systems, such as SBAS generally and Wide Area Augmentation System (WAAS), GPS Aided Geo Augmented Navigation (GAGAN), and Multi-functional Satellite Augmentation System (MSAS), for example, a phase of a GPS signal radio wave may be used to accurately estimate an aircraft position in single frequency (called L1) receivers of the GPS. To use the phase measurement, a user must know the phase ambiguity that theoretically is an integer multiplied by the wavelength. However, the ionosphere delay is substantial in the measurement and yet unknown which gives uncertainty to the ranging estimates to the satellites. The method used is the ground stations estimating the ionosphere delays from their measurements and uploading to the users (e.g., GPS receivers in an aircraft) in coarse sampled grids called ionosphere grid points (IGPs). A user receiver interpolates the IGP data for its line of sight (LOS) and thus estimates its ionosphere delay to each satellite.

In active ionosphere activity regions near the equator, however, the coarse grids often miss the peaks and valleys in the ionosphere charge distribution (called the residuals), and/or the user's LOS may have charge depletion zones (also called "bubbles") that are not viewable from the ground stations. These distortion effects (also including scintillation) can cause considerable errors in the user's estimate of the ionosphere delay.

One technique for solving this problem in navigation system is to avoid measurements affected by depletion. In essence, no attempt is made to estimate the ionosphere delay through the depletion zone even when the measurements are available. Rather, the measurements are simply ignored. In particular, the user uses a depletion detection algorithm to identify and remove all the measurements that went through bubbles and averages the good measurements minus the ionosphere delay estimate from the IGPs to obtain an estimate for a phase ambiguity. Thus, this approach reduces the number of GPS satellites processed for navigation.

One problem with the approach, however, is that in equatorial regions, depletions may be prevalent, and if too many measurements are thrown out, there may not be enough remaining satellites with which to perform accurate ranging. This reduces the availability, the accuracy, and the continuity of the navigation system.

It would, therefore, be desirable to provide to a user accurate estimates of its ionosphere delays in the presence of depletions and appreciable residuals, which translate to a more accurate estimate of a user position.

SUMMARY OF THE INVENTION

In accordance with the concepts, techniques and systems described herein, a GPS receiver for directly estimating depleted ionosphere delay and using the estimate for navigation includes a plurality of filters, each of the plurality of filters adapted to be set to an initialization state and to provide an output value. The GPS receiver further includes a plurality of phase ambiguity and ionosphere delay processors, each of the phase ambiguity and ionosphere delay processors coupled to receive filter values from a corresponding one of the plurality of filters and a receiver autonomous integrity monitor (RAIM)/position computation and smoothing processor coupled to receive an output signal from each of the plurality of each of the plurality of phase ambiguity and ionosphere delay processors and to process the signals to provide an output value corresponding to a location of the receiver.

With this particular arrangement, a GPS receiver that continuously estimates ionospheric delay during flight for each measured satellite regardless of bubble, depletion, and/or scintillation distortion effects is provided. By continuously estimating ionospheric delay during flight for each measured satellite regardless of distortion, the receiver is more accurate than prior art GPS receivers. In one embodiment, the GPS receiver continuously tracks/estimates ionospheric residual delay and phase ambiguity during flight and follows the distortion for each visible satellite with an optimal filter. New satellites coming up can be initialized using existing user position data. Thus, the receiver allows a single frequency user to utilize measurements with the ionosphere depletion. This leads to better receiver availability and accuracy for GPS navigation systems in equatorial regions or in any application is which measurements include distortion effects.

In accordance with further concepts described herein, a method for directly estimating depleted or residual ionosphere delay (generally referred to as distortion herein) and using the estimate for navigation includes combining user code range (CR) and phase and ground ionosphere delay information to form measurements (scalar) for a smoothing filter. In one exemplary embodiment the smoothing filter may be provided as a three-state Kalman filter with the three states corresponding to ionospheric delay, ionospheric delay rate and phase ambiguity.

While Kalman filters are known to be especially effective for smoothing oscillations, it should, of course, be appreciated that any smoothing filter can also be used. The filter estimate is used to estimate true phase (ambiguity and phase measurement), which is accurate range estimate to each GPS satellite. With multiple satellites, a user position is estimated and smoothed with a filter (e.g., another Kalman filter). User position is constantly smoothed and predicted by position smoothing/prediction, which is used when measurement gap occurs due to scintillation or signal fading. By combining position prediction and orbit data in a pseudo truth processor, pseudo truth of code range and phase (range to satellite) values can be obtained. These values can be used to initialize the Kalman filter when measurement resumes. Thus, ionospheric delay estimate begins immediately without waiting for a long averaging process. The pseudo truth processor can also be used to check filter error and bound its error. Optionally the pseudo truth processor can also be coupled to a depletion detector.

If a Local Area Augmented System (LAAS) is operational, its position accuracy is utilized to obtain pseudo truth values for code range and phase. This information can then be used to initialize filter states at the LAAS location (e.g., an airport) prior to aircraft takeoff.

During flight, averaging of the scalar measurement is constantly performed over a pre-determined time period and when it is ready, its output is used to re-initialize the filter. However, in the event of a loss of measurement and/or phase lock slip during the flight, the filter is initialized when measurement resumes from the output of the pseudo truth processor, which provides code range, and phase (which are computed from user predicted position) out of a smoothing filter and orbit data. In preferred embodiments, this technique is used when it is expected that the loss of measurement will be for a short time period. For instance in a typical GPS receiver, the phase lock loop, which measures the phase, recovers in about 120 sec. (resumption of scalar measurement) after a loss of lock. The aircraft is mostly cruising, and therefore, it is deemed that the position smoothing filter will be accurate to allow filter re-initialization.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Described herein are systems and techniques for directly estimating depleted or residual ionosphere delay and using the estimate for navigation in an aircraft. Before describing such systems and related techniques, some introductory concepts and terminology are explained.

Reference is sometimes made herein to systems and techniques which include filters. It should be appreciated, however, that in some embodiments filters are not required. For example, in one embodiment, a User Ionosphere Vertical Error (UIVE) value is derived from GIVE grid point data interpolation and user measurement error estimation. The UIVE value is then used to select a historically best set of IGDs for phase ambiguity estimation. Thus, in such an embodiment, the UIVE estimate is made and when it is determined that the UIVE estimate is at an acceptable value (or within an acceptable range of values) based upon historic data, that UIVE estimate is used to select the ambiguity estimate and no filter is required to provide the ambiguity estimate.

It should also be appreciated that in those systems and techniques which do utilize a filter, reference is sometimes made herein to particular types of filters or particular filtering techniques. For example, reference is sometimes made herein to the use of Kalman filters. It should be understood that reference to a specific type of filter (e.g. a Kalman filter) is not intended to be. and should not be, construed as limiting. Rather, such references are made merely to provide clarity in the description and to promote understanding of the broad concepts, systems and techniques disclosed herein.

It should thus be appreciated that references to Kalman filters are but one specific example of the inclusion of filters in general and that the general concepts, systems and techniques described herein which include filters are not limited to use with Kalman filters. After reading the description provided herein, those of ordinary skill in the art will understand how to select a particular type of filter to fulfill the needs and requirements of a particular application and those of ordinary skill in the art will also appreciate how to select particular filter characteristics to be used in a particular application.

Figure 1:
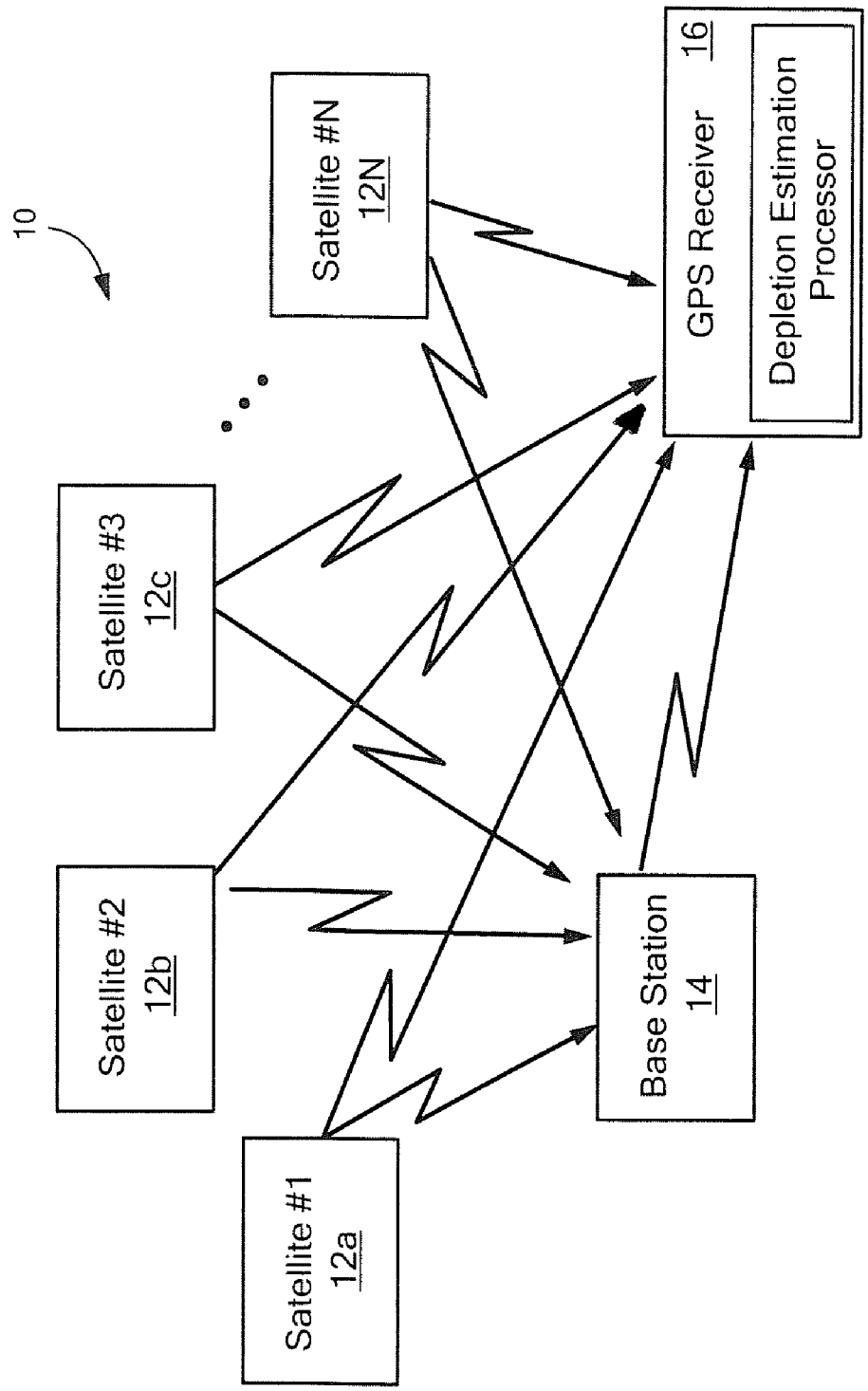
FIG. 1 is a block diagram of a navigation system that directly estimates depleted ionosphere delay and uses the estimate for navigation.

Referring now to FIG. 1, a global positioning system (GPS) 10 includes a plurality of, here N, GPS satellites 12a-12N, a base station 14 (these are also plural), and a GPS user receiver 16. Satellites 12a-12N, which are in line-of-sight (LOS) with base station 14 and user receiver 16, communicate with the base station 14 and the receiver 16. Additionally, base station 14 is in communication with the user receiver 16. (The base stations and receiver may communicate through a geosynchronous satellite).

In general, GPS satellites circle Earth every 12 hours (twice per day). Receiver 16 may be disposed on a fixed platform or a moving platform (e.g., a vehicle such as an aircraft including, but not limited to, a civilian or a military aircraft). Thus, receiver 16 may be stationary or mobile. In either case, over a period of time, the position of receiver 16 changes relative to the position of each of the satellites 12a-12N.

The locations of GPS satellites 12a-12N are used as reference points to assist signal processing in order to determine the location of the user receiver 16. The satellites 12a-12N are a subset of a total of "M" GPS satellites (where N<=M) that form a constellation of "M" number of satellites in the Earth's orbit. As illustrated in the exemplary embodiment of FIG. 1, only some of the satellites (here, N satellites) are in view of the user receiver 16 (that is to say, at an instantaneous time t, receiver 16 is capable of receiving a signal from each of satellites 12a-12N). Each one of the satellites 12a-12N broadcasts one or more precisely synchronized GPS satellite ranging signals toward the Earth. The GPS ranging satellite signals include a Pseudo Random Noise (PRN) Code and Navigation (Nav) message carried on a carrier frequency, such as an L1 and/or L2 carrier frequency. The L1 carrier frequency is 1575.42 MHz and carries both the Nav message and the PRN code for timing. The L2 carrier frequency is 1227.60 MHz.

There are two types of PRN codes. One code is called a Coarse Acquisition (C/A) code and one code is called a Precise (P) code. The C/A code, intended for civilian use, modulates the L1 carrier at a rate of 1.023 MHz and repeats every 1023 bits. The P code, intended for military use, repeats on a seven-day cycle and modulates both the L1 and L2 carriers at a 10.23 MHz rate. When the P code is encrypted, it is called the "Y" code. Additionally, the Nav message is a low frequency signal added to the PRN codes that gives information about the satellite's orbit, clock corrections and other system status information.

Satellites 12a-12N may include other existing satellite navigation systems satellites, such as, for example, Wide Area Augmentation System (WAAS) satellites developed by the Federal Aviation Administration (FAA) and the Department of Transportation (DOT) or Galileo satellite radio navigation system satellites, an initiative launched by the European Union and the European Space Agency. Without loss of generality, the system 10 may incorporate GPS codes, or codes of other satellite navigation system signals, if available, e.g., an integrated GPS-Galileo user receiver.

Some satellites that broadcast correction data for the Wide Area Augmentation System (WAAS) may be in geostationary orbits above the equator. WAAS uses a network of ground-based stations that compare their precisely known location with locations calculated from GPS satellite signals. Differences found can be used to create correction data that is broadcast from WAAS satellites. WAAS can help correct for error caused by distortion of GPS signals as they pass through the ionosphere as well as clock and orbital variations associated with individual GPS satellites.

Base station 14 includes a stationary receiver located at an accurately surveyed point. Base station 14 receives the GPS satellite ranging signals from each of the satellites 12a-12N. As each GPS satellite ranging signal is received by base station 14 and user receiver 16, the satellite signals may be adversely affected by passing through ionosphere depletion (or other distortion) zones. The base stations assemble all their corrected ranging data to all visible satellites and estimate the ionosphere delays over an area or a volume of space in the form of grid points (ionosphere grid points, or IGPs) and uplink them to the user receiver through a geosynchronous satellite. The difference of the ionosphere delay at the user receiver between the one predicted by the grid points and the true delay of the user is defined as the residual ionosphere delay, and the residual may or may not include the depletion.

Receiver 16 searches within a search space region based upon the base-station-location data and acquires simultaneously one or more of the satellite codes (i.e., PRN codes) from the satellites 12a-12N in view of user receiver 16. Additionally, user receiver 16 may acquire simultaneously all of the satellite ranging codes from all of the satellites in view of the user receiver 16 in order to coherently combine, such as summing, received satellite codes and to detect therefrom a probable location of user receiver 16. User receiver 16 combines, or sums, a power output of each of received GPS ranging signals at each of the plurality of grid point locations within the predetermined geographic area, to determine a maximum power output value.

As mentioned above, the satellite signals may be adversely affected by ionosphere conditions. In particular, near the equator, the existence of depletion zones adversely affects the ability of receiver 16 to determine a position with a required or desired degree of accuracy. In this case, receiver 16 includes a depletion estimation processor that continuously estimates ionospheric delay during flight for each measured satellite regardless of bubble or scintillation distortion. By continuously estimating ionospheric delay during flight for each measured satellite regardless of bubble/scintillation, receiver 16 is able to determine a location with a required or desired degree of accuracy. As will become apparent from the description hereinbelow, receiver 16 continuously tracks/estimates ionospheric delay and phase ambiguity during flight and follows depletion/scintillation for each visible satellite with an optimal filter. One of satellites 12a-12N with which receiver 16 are not presently communicating, but with which receiver 16 will be communicating due to change in a position of receiver 16 and/or a change in satellite position, can be initialized using existing user position data.

Figure 2:
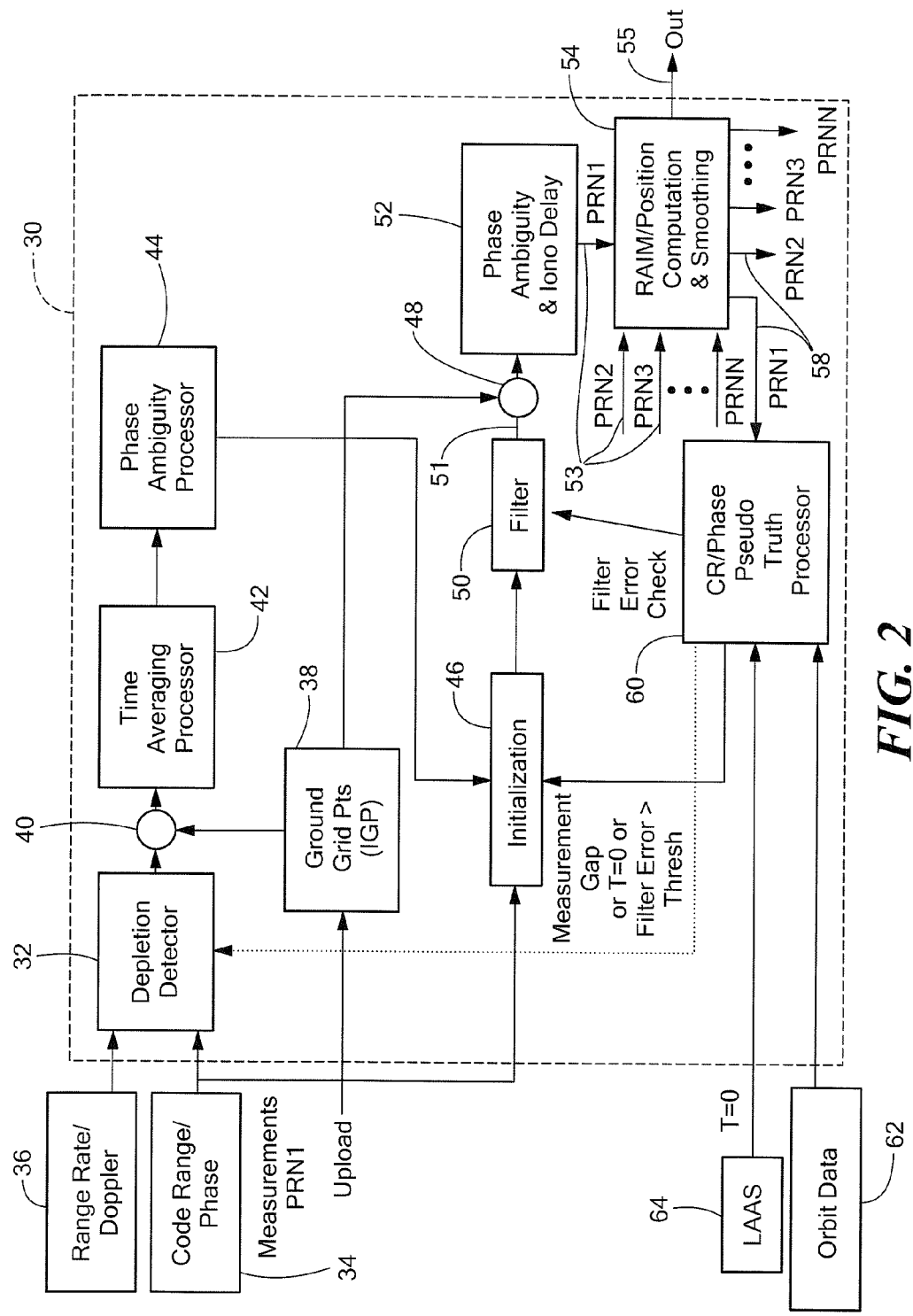
FIG. 2 is a block diagram of a receiver that directly estimates depleted ionosphere delay and uses the estimate for navigation.

Referring now to FIG. 2, a GPS receiver 30 which continuously estimates ionospheric delay during flight for each measured satellite regardless of bubble/scintillation includes a depletion detector 32 which receives code range (CR) and phase measurement signals 34 from satellites 12a-12N. It should be appreciated that to promote clarity in the drawing and text, only a single a set of measurements ($PRN_1$), are shown in FIG. 2. Those of ordinary skill in the art will appreciate of course that receiver 16 receives and processes N such measurements (i.e., $PRN_1$ through $PRN_N$), in a manner known as multi-PRN processing. Additionally, depletion detector 32 receives range rate and Doppler measurements 36. Depletion detector receives the signals 34, 36 provided thereto and looks at the time progress of the measurements. The onset and ending of depletion can be detected by sensing sudden drop and rise, respectively, of the scalar measurement (i.e., the linear combination of code range, phase and IGP prediction).

Output signals from depletion detector 32 and ionosphere grid point (IGP) values 38 uploaded from a ground station (e.g., ground station 14 in FIG. 1) are combined in a combiner 40 to provide a series of values to a time averaging processor 42. Time averaging processor 42 averages the phase ambiguity, which is a linear combination of code range, phase measurement, and IGP prediction provided thereto over time. If depletion detector 32 identifies any depletion, then processor 42 may decide to disregard the measurement or re-start the averaging. As noted above, IGP values are used by the receiver to estimate the baseline ionosphere delay to each satellite without the corruption of the depletion, which is temporary (i.e., it appears and disappears over time).

The output of time averaging processor 42 is fed to a phase ambiguity processor 44 to generate initialization phase ambiguity data, which is stored in initialization storage 46. A time in the range of about 10 minutes to about 120 minutes is typically required to generate initialization values. Initialization values are then provided to a smoothing filter 50.

In one embodiment, smoothing filter 50 is provided as three-state Kalman filter with the three states corresponding to ionospheric residual delay, ionospheric residual delay rate and phase ambiguity. While Kalman filters are known to be particularly effective for smoothing oscillations, it should, of course, be appreciated that any type smoothing filter can also be used.

Filter 50 provides a filter estimate 51 to a combiner 48 which combines filter estimates with IGP values 38 and provides the result to a phase ambiguity and ionospheric delay processor 52. Phase ambiguity and ionospheric delay processor 52 processes the filter estimates and baseline delay from IGP prediction to estimate total ionosphere delay and true phase (ambiguity and phase measurement), which together give an accurate range estimate to each GPS satellite.

Output signals 53 (corresponding to signals $PRN_1$-$PRN_N$) from the corresponding phase ambiguity and ionospheric delay processors 52 (with only one phase ambiguity and ionospheric delay processor 52 being shown for clarity) are provided to a receiver autonomous integrity monitor (RAIM)/position computation and smoothing processor 54. It should be appreciated that RAIM/position computation and smoothing processor 54 receives all of the signals $PRN_1$-$PRN_N$ (i.e., one signal from each of the N satellites). RAIM/position computation and smoothing processor 54 processes each of the signals (e.g., performs triangulation computation) to provide an output signal 55 corresponding to a position (location) of the receiver 30. RAIM is well understood by those skilled in the art. In general, RAIM takes out bad satellites in the formulation of the NAV position solution, i.e., it provides further filtering of corrupted measurements due to depletion or other reasons. Thus, with multiple satellites, a user position is estimated and smoothed with a filter 50 and user position is constantly smoothed and predicted by RAIM/position computation and smoothing processor 54, which is used when a measurement gap occurs due to scintillation or signal fading.

RAIM/position computation and smoothing processor 54 also provides signals 58 (corresponding to signals $PRN_1$-$PRN_N$) to a Code Range (CR)/Phase pseudo truth processor 60. CR/Phase pseudo truth processor also receives orbit data 62. If the receiver loses its measurement inputs (e.g., due to scintillation) then values from CR/Phase pseudo truth processor 60 can be used to re-initialize filter 50 immediately after measurements resume. By combining position prediction and orbit data in a pseudo truth processor, pseudo truth of code range and phase (range to satellite) values can be obtained. These values can be used to initialize the phase ambiguity element of filter 50 state vector when measurement resumes. Thus, ionospheric delay estimation can begin immediately without waiting for a long averaging process, such as the slower averaging process used in prior art systems. The pseudo truth processor 60 can also be used to check filter error and bound the error. Optionally, the pseudo truth processor can also be coupled to the depletion detector 32.

Also optionally, a local area augmentation system (LAAS) may be used to provide very accurate position data 64 to CR/Phase pseudo truth processor 60 to provide initialization information to filter 50 via the CR/Phase pseudo truth processor 60. This technique allows bypassing the averaging process used in prior art systems and allows ionospheric delay estimate to begin at the airport before takeoff. The LAAS position data is used in lieu of the position data from the RAIM/position smoothing processor 52.

Techniques for initialization of filter 50 are next described. The ionosphere delay problem may be expressed mathematically as:

$$p - \phi_m = \phi' + 2I$$

where
p=code pseudorange
$\phi_m$=phase measurement transformed to distance
$\phi'$=phase ambiguity transformed to distance
I=ionosphere delay.

The quantities on the right side above are unknown but with I changing constantly and the phase ambiguity staying constant in time. This fact of different temporal characteristics of the two unknown quantities results in a powerful estimation algorithm, as implemented in the present invention and described below.

To minimize the amplitude of the quantity that we are estimating, we break the delay into the IGP estimate and the residual error (delta I) as shown below:

$$p - \phi_m - \phi' + \epsilon(p - \phi) = 2(I + \delta I)$$

where
p=code pseudo range
$\phi'$=phase ambiguity=constant until cycle slip
$\phi_m$=measured phase converted to range=phase modulo $\lambda$+integrated Doppler
$I_S$=interoplation estimate from IGP's
$\delta I$=residual error of the IGP's.

The aim is to estimate delta I and the phase ambiguity. The estimate can be done with a simple Kalman filter as shown below.

$$z_k = \text{measurement} = p_k - \phi_k - 2I$$

$$x_k = \text{state} = \begin{pmatrix} \delta I_k \\ \delta I_k' \\ \phi_k' \end{pmatrix}$$

$$\Phi = \text{state transition} = \begin{pmatrix} 1 & dt & 0 \\ 0 & 1 & 0 \\ 0 & 0 & 1 \end{pmatrix}$$

$$z_k = H \cdot x_k + \varepsilon$$

$$H = (2, 0, 1)$$

$$R = \text{measurement variance} = \sigma^2(p - \phi) = \sigma^2(p) + \sigma^2(\phi)$$

$$Q = \text{dynamic noise} = \begin{pmatrix} q_1 & 0 & 0 \\ 0 & q_2 & 0 \\ 0 & 0 & q_3 \end{pmatrix}$$

$$\hat{x}_k = \Phi \bar{x}_{k-1}$$

$$\hat{P}_k = \Phi \bar{P}_{k-1} \Phi^T + Q$$

$$K_k = \hat{P}_k H^T (H \hat{P}_k H^T + R)^{-1}$$

$$\bar{x}_k = \hat{x}_k + K_k (z_k - H \hat{x}_k)$$

$$\bar{P}_k = \hat{P}_k - K_k H \hat{P}_k$$

where "^" denotes prediction and "¯" denotes smoothed estimate.

In a first initialization technique, the Kalman filter state initialization can be accomplished using a prior art technique of eliminating depletion-affected measurements. Although this technique can be somewhat time-consuming (e.g., typically in the range of about 10 minutes to about 120 minutes), since the initialization is done only once, the system can take time and weed out depletion affected measurements and do averaging over a long time to obtain a good estimate of the initial phase ambiguity from the IGPs. Then, the initial filter state is:

$$\bar{x}_1 \approx \begin{pmatrix} 0 \\ 0 \\ \phi'_0 \end{pmatrix}$$

A second initialization technique may be done at an airport. Since the aircraft is stationary and its GPS antenna position at the gate can be known precisely, the phase ambiguity can be calculated which becomes the initialization state of the Kalman filter.

In a third initialization technique, initialization for the satellite rising above the horizon to come in view of the user can be done either from the current position of the aircraft or using the first technique described above.

The Kalman filter can also be constructed on the rates as follows.

$$\dot{p} - \dot{\phi} = 2\delta \dot{I} + \epsilon$$

where
$\dot{\phi}$=Doppler
$\dot{p}$=can be obtained from differencing the two consecutive frames.

Thus, we have:

$$\delta \dot{I}_k = 0.5\left(\frac{p_k - p_{k-1}}{dt} - \frac{\dot{\phi}_k + \dot{\phi}_{k-1}}{2}\right) \text{ for } k > 0$$

$$\delta \dot{I}_0 = 0$$

$$\delta \dot{I}_k dt = 0.5\left(p_k - p_{k-1} - \frac{(\dot{\phi}_k + \dot{\phi}_{k-1})dt}{2}\right)$$

$$\delta I_k = \sum_{j=0}^{k} \delta \dot{I}_k dt + I_0$$

where
$I_0$=initial calibration.

To perform the above estimate optimally, the following Kalman filter is established.

$$z_k = \text{measurement} = 0.5\left(\frac{p_k - p_{k-1}}{dt} - \frac{\dot{\phi}_k + \dot{\phi}_{k-1}}{2}\right)$$

$$x_k = \text{state} = \begin{pmatrix} \delta I_k \\ \delta \dot{I}_k \end{pmatrix}$$

$$\Phi = \text{state transition} = \begin{pmatrix} 1 & dt \\ 0 & 1 \end{pmatrix}$$

$$z_k = H \cdot x_k + \varepsilon$$

$$H = (0, 1)$$

$$R = \text{measurement variance} = 0.25\left(\frac{2\sigma^2(p)}{dt^2} + 0.5\sigma^2(\dot{\phi})\right)$$

$$Q = \text{dynamic noise} = \begin{pmatrix} q_1 & 0 \\ 0 & q_2 \end{pmatrix}$$

$$\hat{x}_k = \Phi \bar{x}_{k-1}$$

$$\hat{P}_k = \Phi \bar{P}_{k-1} \Phi^T + Q$$

$$K_k = \hat{P}_k H^T (H \hat{P}_k H^T + R)^{-1}$$

$$\bar{x}_k = \hat{x}_k + K_k (z_k - H \hat{x}_k)$$

$$\bar{P}_k = \hat{P}_k - K_k H \hat{P}_k$$

where "^" denotes prediction and "¯" denotes smoothed estimate.

It should be appreciated that FIG. 2 illustrates an exemplary embodiment of the concepts described herein. Furthermore, in embodiments in which a three-state Kalman filter is used, the initialization of the Kalman filter can be accomplished using one of the techniques described above. It should, however, be appreciated that initialization techniques other than those described below may also be used.

Figure 3A:
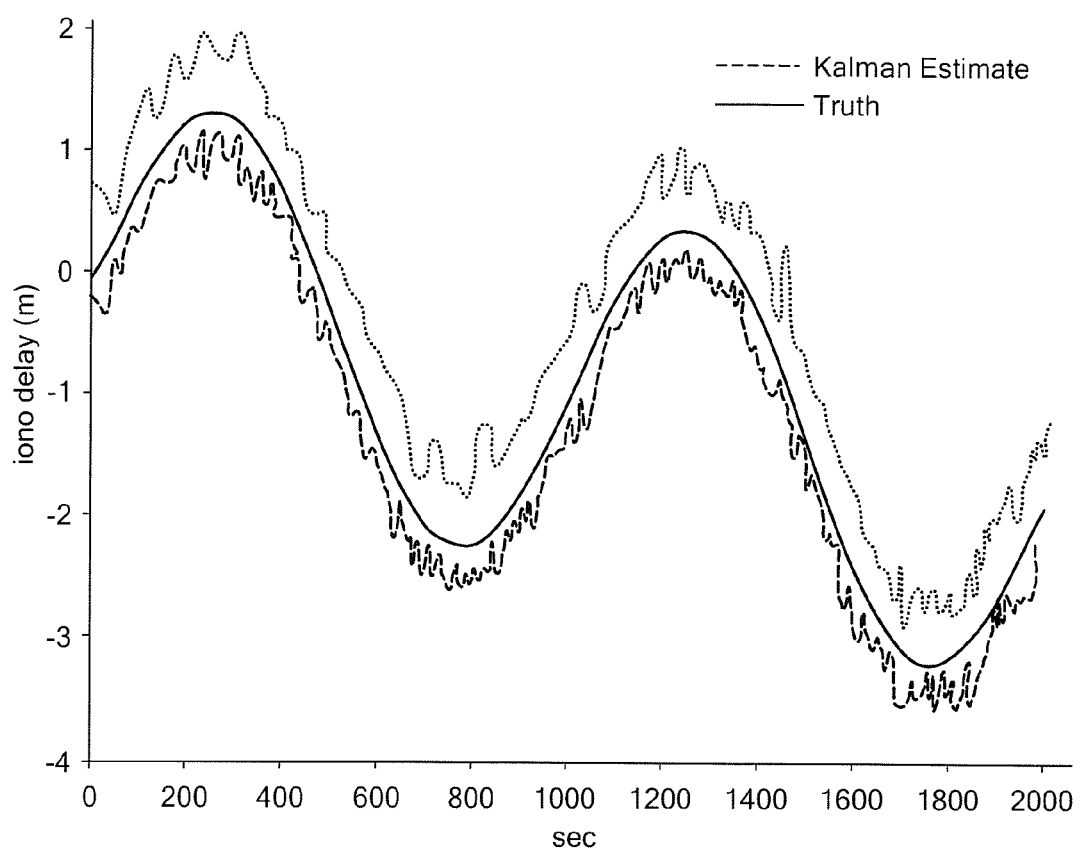
FIG. 3A is a plot of ionospheric residual delay for a Kalman filter vs. time for a receiver which directly estimates depleted ionosphere delay.
Figure 3B:
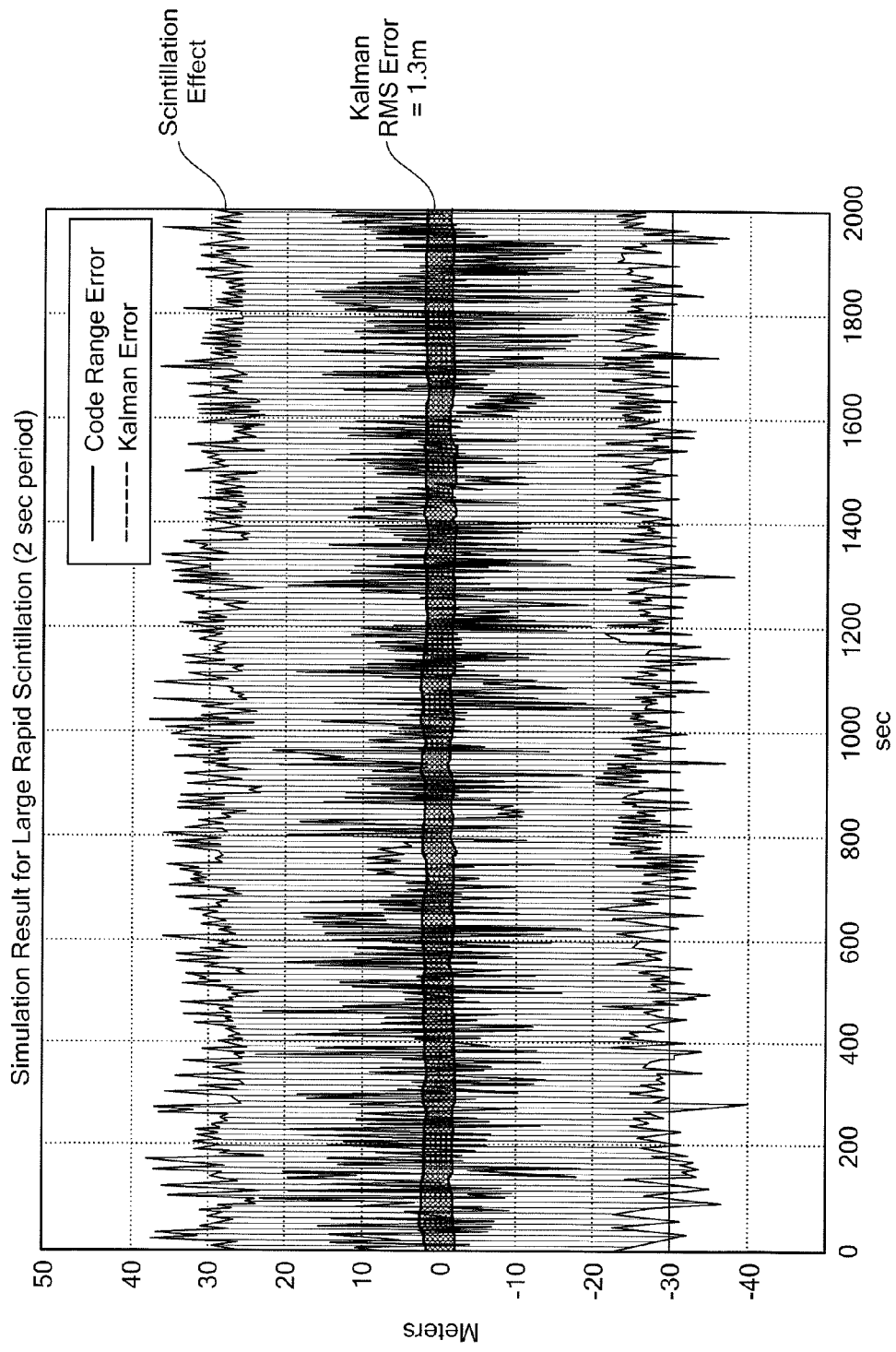
FIG. 3B is a plot of code range error and Kalman filter error vs. time for a receiver which directly estimates depleted ionosphere delay.

Referring now to FIGS. 3A and 3B, simulation results for estimating depleted ionosphere delay and using the estimate for navigation are shown. The system assumptions were: (1) code pseudo range error RMS=5 m (excluding Ionospheric delay); (2) phase measurement error RMS=$\frac{1}{10}^{th}$ of wavelength=0.2 picoradians (prad); (3) measurement sampling time (frame rate)=20 msec; (4) initial range to satellite=24000 km; (5) range rate=−3 km/sec; (6) range acceleration=100 m/sec/sec; (7) ionosphere delay (scintillation)=5.1 nsec delay amplitude with 17 min period+slight downward trend; (8) phase ambiguity=125052631 of wavelength; (9) L1 single frequency; and (10) initial fifty (50) frame averaging of the measurements (z) for the ambiguous phase initialization.

As is evident from inspection of FIGS. 3A and 3B, the system and technique described herein provides better accuracy against the noisy measurements. The RMS error of the Kalman filter is only 0.04 m when the measurement noise RMS is 5 m as indicated by the second graph.

Figure 4:
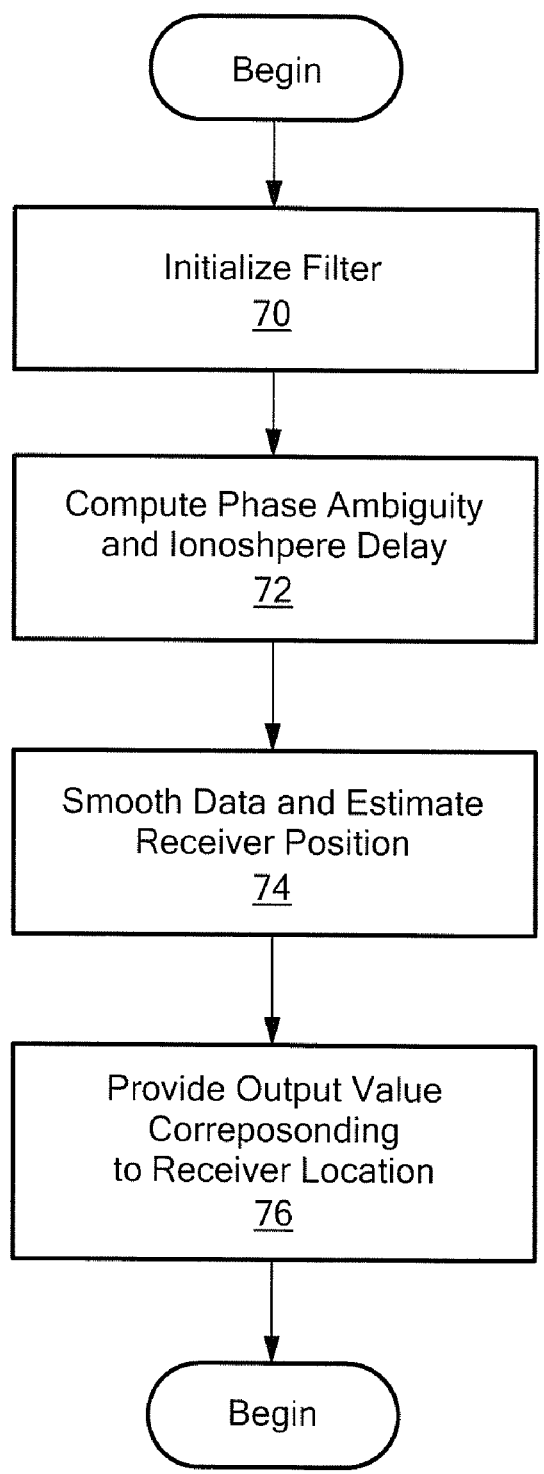
FIG. 4 is a flow diagram illustrating a process for directly estimating depleted ionosphere delay and using the estimate for navigation.

FIG. 4 is a flow diagram showing the processing performed to estimate depleted ionosphere delay and use the estimate for navigation.

The rectangular elements (typified by element 70 in FIG. 4) are herein denoted "processing blocks" and may represent computer software instructions or groups of instructions. It should be noted that the flow diagram of FIG. 4 represents one embodiment of the design and variations in such a diagram, which generally follow the process outlined are considered to be within the scope of the concepts described and claimed herein.

Alternatively, the processing and decision blocks represent operations that may be performed by functionally equivalent circuits such as a digital signal processor circuit or an application specific integrated circuit (ASIC) of a field programmable gate array (FPGA). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence described is illustrative only and can be varied without departing from the spirit of the concepts described and/or claimed herein. Thus, unless otherwise stated, the processes described below are unordered, meaning that (when possible) the sequences shown in FIG. 4 can be performed in any convenient or desirable order.

Alternate Embodiments

Figure 5:
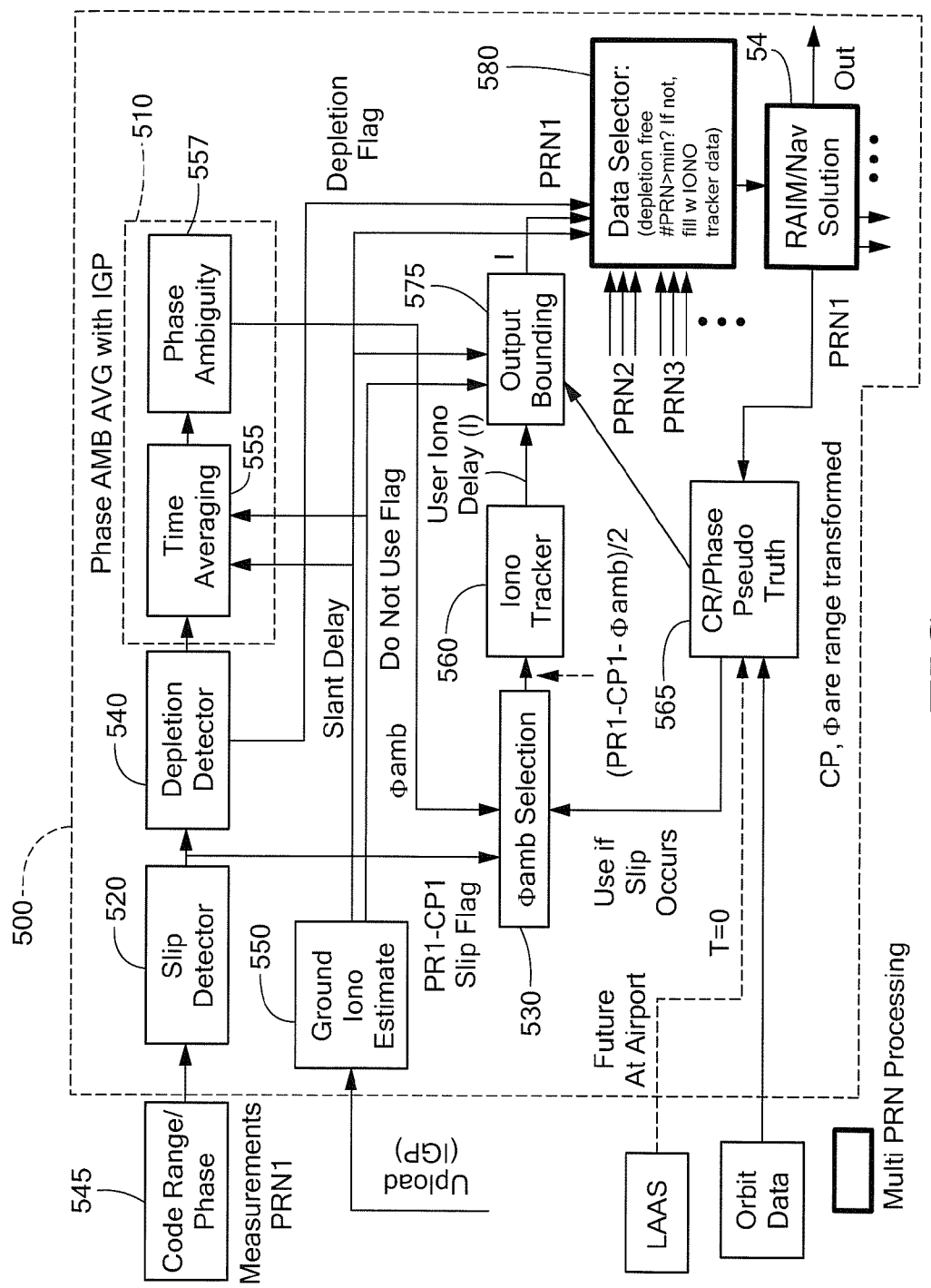
FIG. 5 is a block diagram of an alternate embodiment of a receiver that directly estimates depleted ionosphere delay and uses the estimate for navigation.

As shown in FIG. 5, user autonomous navigation when the ground data are bad (DO NOT USE FLAG positive) or when in depletion (DEPLETION FLAG positive) may be accomplished by freezing the phase ambiguity estimation obtained from the phase ambiguity average with IGP module 510, which averages a combination of the user measurements and the ground IGPs. The user is autonomous from the ground during this time. Here, when a phase lock slip occurs (detected in slip detector 520), the embodiment shown here uses the ionosphere delay estimate from the prior time to compute the phase ambiguity in phase ambiguity selection processor 530 without waiting for the new averaging process output.

As in FIG. 2, the receiver 500 of FIG. 5 has a depletion detector 540 that receives code range (CR) and phase measurement signals 545 from satellites 12a-12N (not shown). As before, only a single a set of measurements ($PRN_1$), are shown for clarity of illustration. Depletion detector 540 receives the code range and phase measurements and the slip detection information from slip detector 520. In an exemplary embodiment, depletion detector 540 determines the onset and ending of depletion in a manner similar to that employed in depletion detector 32 of FIG. 2.

Output signals from depletion detector 540 and ground ionosphere estimates (for example, but not limited to, IGPs) 550 are provided to time averaging processor 555. Time averaging processor 555 averages the phase ambiguity, which is a linear combination of code range, phase measurement, and IGP prediction provided thereto over time. If depletion detector 540 identifies any depletion (which is signaled by raising the Do Not Use flag for any measurement where depletion is detected), then processor 555 may decide to disregard the measurement or re-start the averaging.

The output of time averaging processor 555 is fed to a phase ambiguity processor 557 to generate phase ambiguity data, which is sent to phase ambiguity selection processor 530. Phase ambiguity is detected according to:

$$\text{PhaseAmbiguity}=\text{avg}[PR1(t)-CP1(t)-2*I'(t)]$$

wherein:
PR1(t)=pseudo range measurement for PRN1;
CP1(t)=carrier phase measurement for PRN1;
I'=delay estimate from IGPs; and
avg[ ]=time average during the depletion/slip free period.

It should be appreciated that in one embodiment, the minimum averaging time is in the range of about 0 minutes to about 15 minutes.

Phase ambiguity may also be expressed as:

$$\text{PhaseAmbiguity}=\text{avg}[PPR(t)-CP1(t)]$$

immediately after slip until the IGP averaging function described above becomes available, where PPR=predicted pseudo range.

The selected phase ambiguity value is then provided to ionospheric tracker 560. Note that the phase ambiguity averaging and ionospheric tracker loops run continuously. The ionosphere tracker tracks the ionospheric delay. In one exemplary embodiment, ionosphere tracker 560 may include a filter having a characteristic transfer function described as:

$$Z(t)=(PR1(t)-CP1(t)-\text{PhaseAmbiguity})/2=\text{input to tracker}$$

where all phases are range transformed. I(t), the ionospheric delay as a function of time, is then expressed as:

$$I(t)=w1(t)*Z(t)+w2(t)*[I(t-dt)+CP1(t)-CP1(t-dt)]$$
$$w1+w2=1$$

where w1(t) and w2(t) are the filter weighting functions over time.

As noted above, at initialization or after a cycle slip, predicted pseudo range (PPR) from pseudo truth block 565 is used to compute phase ambiguity. When the phase ambiguity from averaging becomes available after slip (or after warm up), the averaging output from phase ambiguity processor 557 is used.

Output bounding module 570 bounds the user ionospheric delay estimate I from ionospheric tracker 560 as follows:

$$\text{Ground Estimate}-T1<=I<=\text{Ground Estimate}+T1$$
$$(T1=5)$$

$$(PPR-PR1)-T2<=I<=(PPR-PR1)+T2 (T2=8)$$

wherein
PPR=predicted pseudo range;
PR1=pseudo range measurement for PRN1;
T1=threshold 1
T2=threshold 2.

Data selector 580 determines which ionospheric delay information to use. If the number of satellites with depletion flag off is greater than or equal to (>=) the minimum number of satellites needed (referred to herein as T3), then data selector 580 only uses the Ground Estimates from the IGPs. If the number of satellites with depletion flag off is less than T3 (i.e., not enough satellites are available), data selector 580 will use only the PRNs with depletion flag off plus the solutions from ionospheric tracker 560 until T3 is satisfied. Ionospheric tracker 560 solution ranking is according to smallest ABS(I) and elevation angle. If more than enough satellites are available, RAIM 54 performs chi square consistency testing among the satellites used.

Pseudo truth block 565 maintains the predicted pseudo range based on user position and orbit data for each viewed satellite. The predicted pseudo range is expected to be depletion free.

Figure 6:
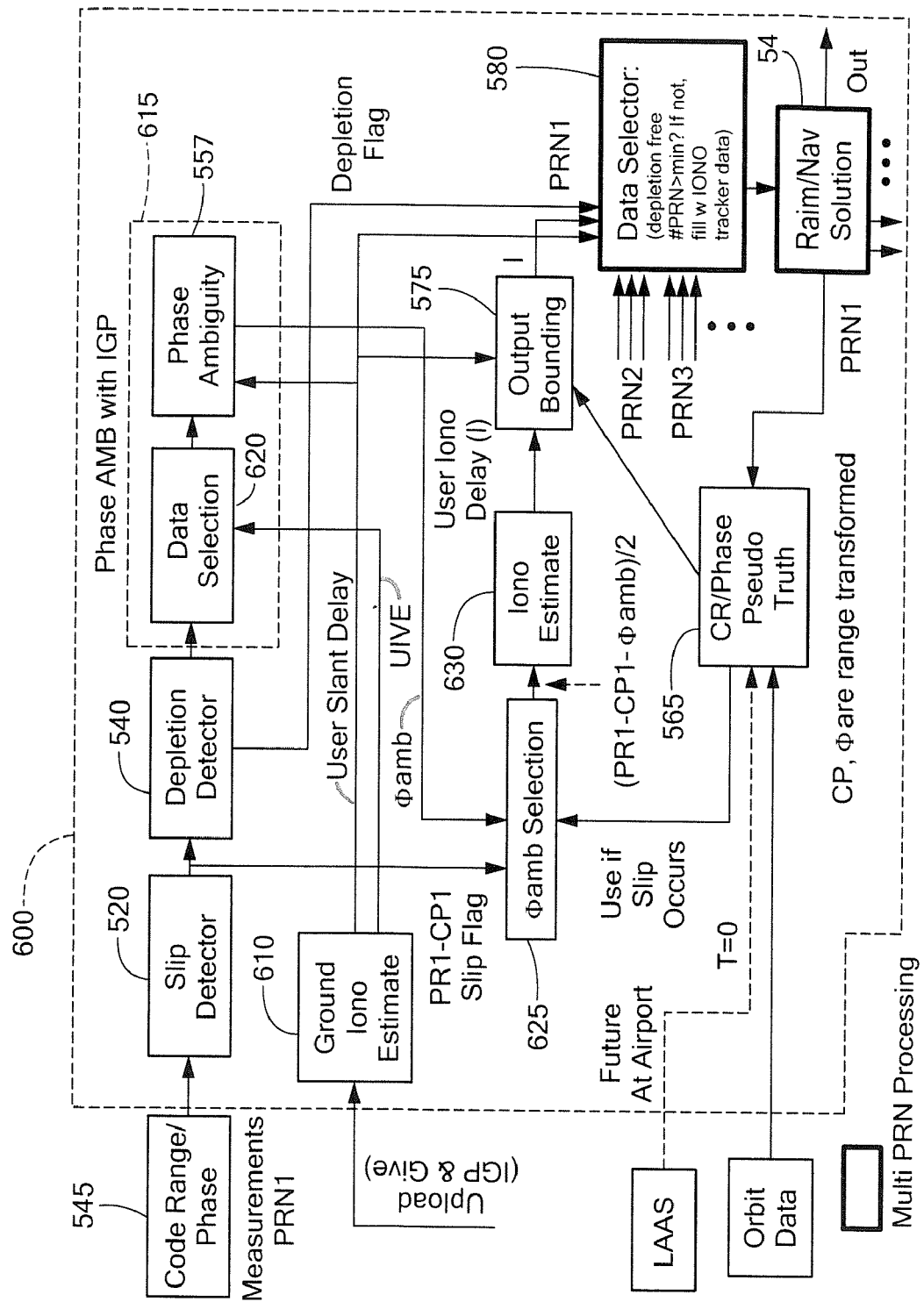
FIG. 6 is a block diagram of a further alternate embodiment of a receiver that directly estimates depleted ionosphere delay and uses the estimate for navigation.

In another alternate embodiment, the user's autonomous mode is further expanded, i.e., the user is expected to be autonomous most of the time unless a more accurate ground update occurs as described below. As shown in receiver 600 of FIG. 6, the additional information from the ground (the Grid Ionosphere Vertical Error [GIVE]), which is an estimate of the accuracy of the Ionosphere Grid Delay [IGD]) is used to determine the ground ionosphere estimates from the IGPs in a ground ionosphere estimate module 610 before applying them to a phase ambiguity estimation in the phase ambiguity in IGP processor 615. More specifically, the User Ionosphere Vertical Error (UIVE), derived from the GIVE grid point data interpolation and the user measurement error estimation (the two can be combined via root-sum-squared technique, for example), is used by data selection module 620 to select the one historically best set of IGDs for the phase ambiguity estimation with the condition that there is no depletion detected (Depletion Flag negative) during approximately plus or minus 5 to 10 minutes around the time of the IGD uplink. The formula used for the ambiguity estimation is:

$$\Phi_{AMB}=pr-cp-2I_g$$

where
pr=pseudo range measurement
cp=carrier phase measurement
$I_g$=estimate (interpolation) of user delay from four surrounding IGDs.

The UIVE is obtained from four surrounding GIVE grid points in the same way as the $I_g$. Thus, the UIVE is the figure of merit in applying the IGDs to the phase ambiguity estimate.

in this exemplary embodiment, measurement averaging is not necessary and the best phase ambiguity and its corresponding lowest UIVE are stored in memory 625 until a lower UIVE arrives from the ground update, at which time the phase ambiguity is updated and the memory is updated with the new data set. Meanwhile, the current best phase ambiguity is always used to estimate the user ionosphere delay (ionosphere estimate module 630) using the formula:

$$I = \frac{pr - cp - \Phi_{AMB}}{2}$$

where
I=user ionosphere delay.

Furthermore, the application of the new best phase ambiguity to the user ionosphere delay computation can be time delayed (typically about 5-10 minutes) to allow for the depletion detector's detection latency. During this time delay (the waiting period), the old phase ambiguity estimate is used. If depletion is detected during this waiting period, then the new phase ambiguity is discarded in favor of the old one.

The phase ambiguity selection function 625 remains essentially the same as that discussed above: it stores the current user delay estimate and re-computes the phase ambiguity with the new pseudo range and phase measurements immediately after the cycle slip with as per the following formula:

$$\Phi_{AMB} = pr - cp - 2I_{old}$$

where
pr=pseudo range measurement after slip
cp=carrier phase measurement after slip
$I_{old}$=user delay prior to slip.

This phase ambiguity is used until the new and better estimate arrives from the phase ambiguity with IGP processor 615.

Having described preferred embodiments that serve to illustrate various concepts, structures and techniques, which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. A GPS receiver comprising:
   a plurality of filters, each of said plurality of filters having a programmable initialization state and providing an output value;
   a plurality of phase ambiguity and ionosphere delay processors, each of the phase ambiguity and ionosphere delay processors coupled to receive an output value from a corresponding one of the plurality of filters and to provide a corresponding ionosphere delay-corrected signal in response thereto; and
   a RAIM/position computation and smoothing processor coupled to receive the ionosphere delay-corrected signal from each of the plurality of phase ambiguity and ionosphere delay processors and to process the ionosphere delay-corrected signals to provide a result corresponding to a location of the receiver;
   a pseudo truth processor coupled to receive the result corresponding to a location of the receiver and to store the result for determining at least a portion of the initialization state of the plurality of filters; and
   a depletion detector configured to receive a plurality of measurements and coupled to the plurality of filters and the pseudo truth processor, wherein the depletion detector is configured to eliminate depletion-affected measurements from further filtering.

2. The GPS receiver according to claim 1, wherein the pseudo truth processor receives at least one LAAS data signal and wherein the at least one LAAS data signal determines at least a portion of the initialization state of the plurality of filters.

3. A method of operating a GPS receiver on a vehicle in flight, the method comprising:
   (a) receiving, in the receiver, values from a plurality of GPS satellites, at least some of the values affected by unpredicted residual ionosphere delay;
   (b) combining user code range (CR) values and phase and ground ionosphere delay information in a depletion detector to detect a difference between ionosphere delay at the GPS receiver and ionosphere delay predicted by ground base stations in the form of grid points;
   (c) continuously estimating ionospheric delay and phase ambiguity during flight for each measured GPS satellite regardless of the existence of distortion affects;
   (d) estimating the residual ionosphere delay; and
   (e) using the values and the estimate of the residual ionosphere delay to compute the position of the GPS receiver.

4. A method of operating a GPS receiver for use in a vehicle, the method comprising:
   (a) initializing a filter to a present location of the vehicle;
   (b) using the initialized filter, filtering the present location and ground data to produce an intermediate estimate;
   (c) providing the intermediate estimate to a phase ambiguity and ionosphere delay processor;
   (d) processing the intermediate estimate in the phase ambiguity and ionosphere delay processor to estimate an ionosphere delay value; and
   (e) providing the estimated ionosphere delay value from the phase ambiguity and ionosphere delay processor to a RAIM/position computation and smoothing processor; and
   (f) processing the estimated ionosphere delay value in the RAIM/position computation and smoothing processor to provide a location value.

5. The method of operating a GPS receiver according to claim 4, wherein the filter is a Kalman filter.

6. The method of operating a GPS receiver according to claim 4, wherein the vehicle is an aircraft.

7. A GPS receiver comprising:
   a plurality of phase ambiguity selectors each configured to receive a plurality of average phase ambiguity estimates;
   a corresponding plurality of ionosphere delay trackers each coupled to the plurality of phase ambiguity selectors and configured to select from a plurality of phase ambiguity estimates to initialize a filter therein, said filter producing an output value;
   a corresponding plurality of output bounding processors each coupled to the plurality of ionosphere delay trackers and configured to provide a corresponding ionosphere tracking signal in response thereto;
   a corresponding plurality of data selectors each coupled to the plurality of output bounding processors and configured to receive the corresponding ionosphere tracking signal and to output a ionosphere delay-corrected signal if depletion is not detected; and
   a RAIM/position computation and smoothing processor coupled to receive the ionosphere delay-corrected signal from each of the plurality of output bounding processors and to process the signals to provide result corresponding to a location of the receiver.

8. The GPS receiver according to claim 7, wherein the filter is a Kalman filter.

9. The GPS receiver according to claim 7, further comprising a pseudo truth processor coupled to receive the result corresponding to a location of the receiver and to store the result for initializing the plurality of filters.

10. The GPS receiver according to claim 9, further comprising a depletion detector configured to receive a plurality of measurements and coupled to the plurality of data selectors, wherein the depletion detector is configured to eliminate depletion-affected measurements from selection.

11. The GPS receiver according to claim 9, wherein the pseudo truth processor receives at least one LAAS data signal and wherein the at least one LAAS data signal at least partly determines the initializing.

12. The GPS receiver according to claim 7, wherein the ionosphere tracking signal is time-delayed prior to receipt at the corresponding plurality of output bounding processors.

13. The GPS receiver according to claim 7, wherein selecting the plurality of phase ambiguity estimates for the ionosphere delay estimates are determined at least in part by GIVE data uploads and UIVE processing.

14. A GPS receiver comprising:
a depletion detector configured to receive code range (CR) values, phase measurement signals and slip detection information and to provide at an output thereof one or more depletion signals, each of the one or more depletion signals having a value corresponding to one of: (1) a first value which indicates an onset of depletion; or (2) a second value which indicates an ending of depletion;
a ground ionosphere estimate module configured to receive ionosphere grid point (IGP) values at an input thereof and to provide ground ionosphere estimate values at an output thereof;
a time averaging processor configured to receive output signals from said depletion detector and ground ionosphere estimate values from said ground ionosphere estimate module at an input thereof and to provide average phase ambiguity data at an output thereof;
a phase ambiguity processor configured to receive average phase ambiguity data from said time averaging processor and to generate phase ambiguity data;
a phase ambiguity selection processor configured to receive phase ambiguity data from said phase ambiguity processor;
an ionospheric tracker module, which tracks ionospheric delay, said ionospheric tracker module configured to receive a selected phase ambiguity value from said phase ambiguity selection processor and to provide a user ionospheric delay estimate (I) at an output thereof;
an output bounding module, configured to receive the user ionospheric delay estimate (I) from the output of said ionospheric tracker module wherein said output bounding module bounds a user ionospheric delay estimate (I); and
a data selector configured to receive: (a) ground ionosphere estimate values from said ground ionosphere estimate module; (b) user ionospheric delay estimates from said output bounding module; and (c) the depletion signal from said depletion detector and in response thereto, said data selector determines which ionospheric delay information to use.

15. The GPS receiver of claim 14 wherein:
in response to a number of depletion signals having the second value being greater than or equal to a minimum number of satellites needed, said data selector selects the ground ionosphere estimates; and
in response to a number of depletion signals having the second value being less than the minimum number of satellites needed, said data selector selects: (1) pseudo random noise (PRN) values from satellites having depletion signals with the second value; and (2) user ionospheric delay estimates from said ionospheric tracker until the minimum number of satellites needed is satisfied.

16. The GPS receiver of claim 14 wherein in response to depletion detector identifying a depletion, then said time averaging processor may disregard a measurement or re-start an averaging of phase ambiguity data.

17. The GPS receiver of claim 16 wherein the phase ambiguity is provided as a linear combination of code range, phase measurement, and IGP prediction provided to said time averaging processor over time.

18. The GPS receiver of claim 17 wherein the phase ambiguity is detected according to: phase ambiguity=avg[PR1(t)−CP1(t)−2*I'(t)] and wherein:
PR1(t)=pseudo range measurement for PRN1;
CP1(t)=carrier phase measurement for PRN1;
I'=delay estimate from IGPs; and
avg[ ]=time average during the depletion/slip free period.

19. The GPS receiver of claim 18 wherein the averaging time is in the range of about 0 minutes to about 15 minutes.

20. The GPS receiver of claim 17 wherein the phase ambiguity is detected according to: PhaseAmbiguity=avg[PPR(t)−CP1(t)] and wherein:
PPR(t)=predicted pseudo range; and
CP1(t)=carrier phase measurement for PRN1.

21. The GPS receiver of claim 14 wherein said ionosphere tracker comprises a filter.

22. The GPS receiver of claim 14 wherein said depletion detector is configured to receive code range (CR) and phase measurement signals from one or more satellites.

23. The GPS receiver of claim 14 further comprising a pseudo truth module which maintains a predicted pseudo range based upon user position and orbit data for each viewed satellite wherein at initialization or after a cycle slip, one or more predicted pseudo range (PPR) values from said pseudo truth module are used to compute phase ambiguity and when the phase ambiguity from averaging becomes available after slip (or after warm up), the averaging output from phase ambiguity processor is used.

24. The GPS receiver of claim 23 wherein said pseudo truth module is configured to receive at least one of: orbit data from a satellite; or local area augmented system (LAAS) data.

25. A GPS receiver comprising:
a depletion detector configured to receive code range (CR) values, phase measurement signals and slip detection information and to provide at an output thereof one or more depletion signals, each of the one or more depletion signals having a value corresponding to one of: (1) a first value which indicates an onset of depletion; or (2) a second value which indicates an ending of depletion;
a ground ionosphere estimate module configured to receive ionosphere grid point (IGP) values and GIVE grid point data at an input thereof and to provide ground ionosphere estimate values and user ionosphere vertical error (UIVE) values at an output thereof;
an IGP processor configured to receive the UIVE values at an input thereof and to provide a phase ambiguity estimation at an output thereof;

a phase ambiguity selection processor configured to receive phase ambiguity data from said phase ambiguity processor and having stored therein a selected phase ambiguity value and its corresponding lowest UIVE value;

an ionospheric estimate module which receives the selected phase ambiguity value and its corresponding lowest UIVE value and estimates a user ionosphere delay value and provides the estimated user ionosphere delay value at an output thereof;

an output bounding module, configured to receive the estimated user ionosphere delay value from the output of said ionospheric estimate module wherein said output bounding module bounds the estimated user ionosphere delay value; and a data selector configured to receive: (a) ground ionosphere estimate values from said ground ionosphere estimate module; (b) user ionospheric delay values from said output bounding module; and (c) the depletion signal from said depletion detector and in response thereto, said data selector determines which ionospheric delay information to use.

26. The GPS receiver of claim 25 wherein said IGP processor comprises:

a data selection processor configured to receive UIVE values and user measurement error estimation values from said ground ionosphere estimate module at an input thereof and to select a historically best set of IGDs for a phase ambiguity estimation with the condition that there is no depletion detected during approximately a predetermined period of time around the time of the IGD uplink; and a phase ambiguity processor configured to receive the phase ambiguity estimation from said data selection processor and to provide phase ambiguity data at the output of said IGP processor.

27. The GPS receiver of claim 25 wherein said ground ionosphere estimate module derives the UIVE values from the GIVE grid point data interpolation and the user measurement error estimation.

28. The GPS receiver of claim 25 wherein said depletion detector is configured to receive code range (CR) and phase measurement signals from one or more satellites.

29. The GPS receiver of claim 25 further comprising a pseudo truth module which maintains a predicted pseudo range based upon user position and orbit data for each viewed satellite wherein at initialization or after a cycle slip, one or more predicted pseudo range (PPR) values from said pseudo truth module are used to compute phase ambiguity and when the phase ambiguity from averaging becomes available after slip (or after warm up), the averaging output from phase ambiguity processor is used.

30. The GPS receiver of claim 29 wherein said pseudo truth module is configured to receive at least one of: orbit data from a satellite; or local area augmented system (LAAS) data.

31. The GPS receiver of claim 25 wherein said phase ambiguity selection processor stores a current user delay estimate and re-computes a phase ambiguity with a new pseudo range and phase measurement immediately after a cycle slip.

32. The GPS receiver of claim 31 wherein said phase ambiguity selection processor re-computes a phase ambiguity as:

$$\Phi_{AMB} = pr - cp - 2I_{old}$$

where
pr=pseudo range measurement after slip
cp=carrier phase measurement after slip
$I_{old}$=user delay prior to slip; and
wherein the re-computed phase ambiguity is used until a new estimate arrives from said IGP processor.

* * * * *